2 Sheets—Sheet 1

C. W. Siemens
Rotary Meter.

Nº 22,315.　　　　Patented Dec. 14, 1858.

Witnesses.
Charles Cowper
John R. Barker

Inventor.
C. W. Siemens

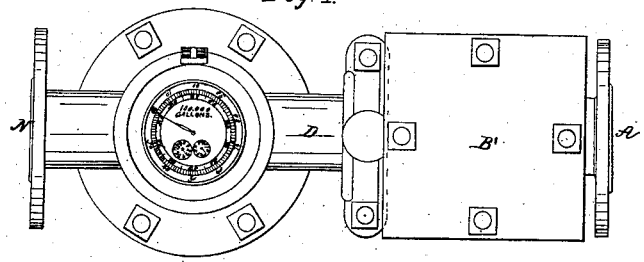
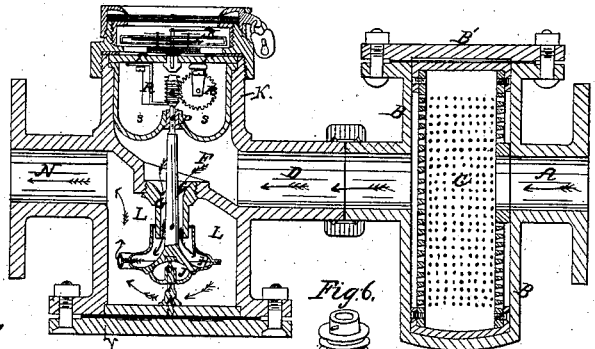
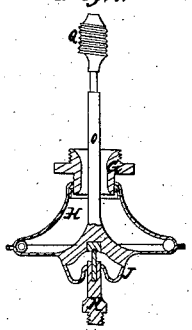
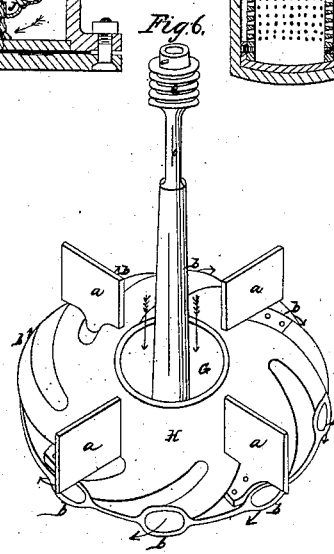
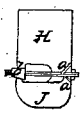
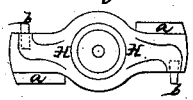

UNITED STATES PATENT OFFICE.

CHARLES W. SIEMENS, OF LONDON, ENGLAND.

IMPROVEMENT IN FLUID-METERS.

Specification forming part of Letters Patent No. 22,315, dated December 14, 1858.

*To all whom it may concern:*

Be it known that I, CHARLES WILLIAM SIEMENS, of London, in England, a subject of the Grand Duke of Mecklenburg-Strelitz, have invented new and useful Improvements in Fluid-Meters; and I do hereby declare that the following is a full, clear, and exact description thereof, reference being had to the accompanying drawings, which make a part of this specification.

Figure 1:
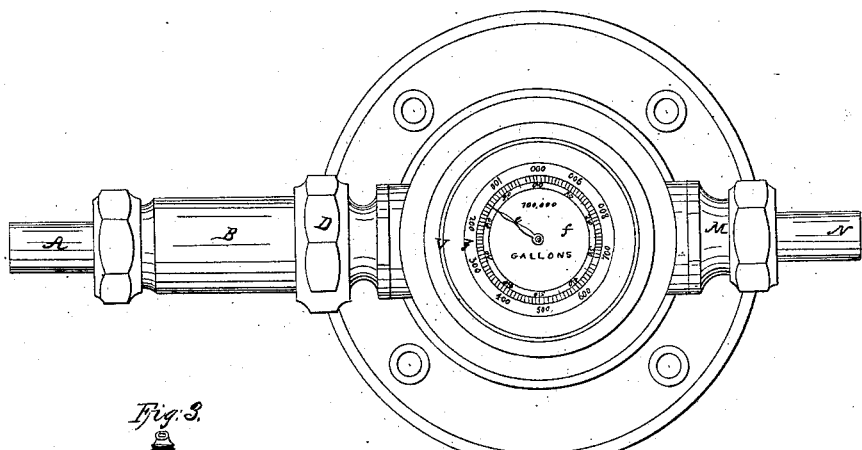
Figure 3:
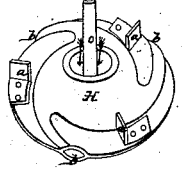
Figure 2:
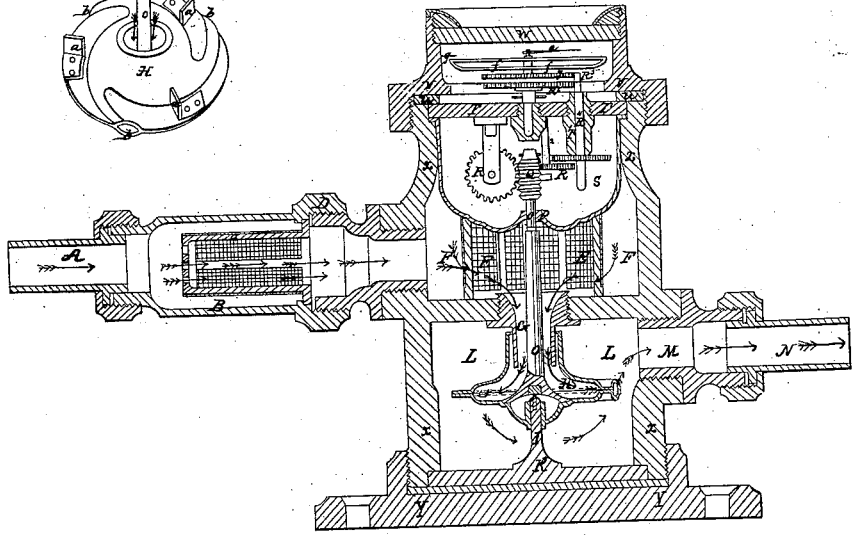

Figure 1, Sheet I, is a full-sized plan of a fluid-meter constructed according to my invention. Fig. 2 is a vertical section of the same. Fig. 3 is a perspective view of the drum or measuring-wheel.

The same letters refer to similar parts in each figure.

This meter is well adapted for measuring water supplied to manufactories and houses, and will act either under great pressure or under very little pressure and with great variations in the quantity of water passing through it per minute.

A is the inlet-pipe, and N is the outlet-pipe. The water passes from A into the enlarged pipe or dirt-box B, in which is a perforated tube or cage, C, surrounded by wire-gauze. The dirt-box B is screwed at D to a short neck in the side of the case of the meter X X. The water is thus conducted into the annular space F, surrounding another cage covered with wire-gauze E, through which it passes down the throat G into the measuring wheel or drum H. This wheel is shown in perspective in Fig. 3. It consists of two plates of metal stamped or cast to the required shape and soldered together, so as to leave three channels or tubes, $b\ b\ b$, communicating with a central cavity. The upper plate has a neck with the edge turned over, which fits as close as possible without touching the outside of the throat G. The water in flowing through the channels $b$ causes the drum to revolve on the same principle as a wheel of a turbine or reaction wheel, and the quantity of water passing through is measured and indicated by the number of revolutions of the drum. The top and bottom of the drum are curved, as shown in the drawings, so that the fluid may flow in and through it with as little obstruction as possible. The drum is attached to a spindle, O, the upper end of which passes through a hole, P, in a brass cup or oil-chamber, S, hereinafter described. A small flat or hollow piece of steel or agate is fixed to the lower end of the spindle O and rests upon a round-pointed piece or pivot of steel or agate at the top of the cylindrical stem I, which rises from the center of the disk K and passes through a hole or bush in the oil cup or box J. This box is filled with oil, which has no means of escape except between the bush and stem I. The oil is thus retained for a great length of time, and any oil which does escape is replaced by water. The bush reaches to the top of the stem I, or nearly so. The oil, being lighter than the water, remains in contact with the pivot and the bush until it is almost entirely exhausted and replaced by water. The oil is not liable to escape, and it cannot all escape in whatever position the meter may be placed in transporting it from one place to another. The water passes from the apertures of the drum into the chamber L, and thence by the neck M to the outlet-pipe N.

On the top of the spindle O is fixed a screw, Q, which drives a wheel, R, on a horizontal spindle, which carries another endless screw driving a wheel, R'. The spindle of the wheel R' carries a pinion, $R^2$, which drives a wheel, $R^3$, on a vertical spindle, $R^4$, which passes through a tube or socket, T', and carries a pinion, $R^5$. The spindle $R^4$ has a conical shoulder which fits the lower end of the tube T' and is forced against it by the pressure of the water in the meter. Although this pressure may be considerable, but little power is consumed in turning the spindle $R^4$, because its motion is very slow. Thus it may make one revolution for several hundred or several thousand revolutions of the drum H. The oil-chamber S is filled completely full of oil up to its cover T, which carries the wheels and pinions, and is secured by a leather washer, U, and the screw-cap V.

The pinion $R^5$ drives two wheels, $R^6$ and $R^7$. The wheel $R^6$ is fixed on its spindle and carries an index or hand, $e$. The wheel $R^7$ is mounted on a tube or collar turning loose on the spindle and carrying a dial, $f$. To the side of the cap V is fixed an index, $g$, which projects a little over the edge of the dial. The dial is divided into one hundred divisions. The wheel $R^6$ has one hundred teeth and the wheel $R^7$ has one hundred and one teeth. Thus when the dial $f$ makes one revolution the hand $e$ will make one revolution and one-hundredth part of a revolution. The hand will thus be advanced one division on the dial. Thus if the parts be so proportioned that the dial may make one revolution during the passage of one thousand gallons of water through the meter each division which the hand advances on the dial will indicate one thousand gallons, and the complete revolution of the hand with regard to the dial will indicate one hundred thousand gallons. Each division of the dial which passes the fixed index will indicate ten gallons. The dial or counter is protected by a strong glass, W.

I have found that a simple wheel or drum with curved channels does not register correctly at varying velocities. Thus if it be adjusted to register correctly when a small quantity of water per minute is passing through, it will register in excess when a large quantity per minute is passing through. In order to cause it to register correctly at varying velocities, I attach retarding-vanes $a\,a\,a$, Fig. 3, to the drum. These vanes make a slight resistance to the motion at slow velocities, but a much greater resistance at high velocities. By adjusting the size of these vanes the meter may be adjusted to register correctly at very different velocities.

Fig. 4, Sheet II, is a plan, and Fig. 5 is a vertical section, of a larger meter drawn to a scale of one-third of the full size. Fig. 6 is a perspective view of the drum or measuring-wheel of the full size. This drum has eight passages, $b\,b$, and four vanes, $a\,a$. The dirt-box B is constructed somewhat differently from that shown in Sheet I, so that it may be readily cleaned out without disturbing the pipes. C is a perforated tube or cage closed by a cap at each end, and having a lateral, aperture corresponding with the inlet-pipe A. This tube C is dropped into the dirt-box B, which is then closed by its cover B', which is secured by bolts and nuts. The water from the inlet-pipe A enters the tube C and passing through the perforations enters the box B and flows through the pipe D into the chamber F, and through the throat G, drum H, and chamber L to the outlet N. When the dirt-box requires cleaning, the cover B' is removed and the tube C is lifted out and the dirt removed from it, and it is then replaced in the box B and the cover again fixed on. The upper cap of the tube C may have a hole in it, in which a hook may be inserted to lift it out; or the tube may be made without a cap at the upper end, but with a rim or flange to prevent the passage of dirt and to keep the tube C in its proper position. The tube C and box B may be of a square form or otherwise, so arranged that the tube C may not be liable to turn or shift out of its place, so as to remove its lateral opening from the inlet-pipe A. The spindle O of the drum H communicates its motion by endless screws and wheels and pinions to the counter, which may be constructed as shown in Sheet I, or in any other suitable manner. In other respects the action of the meter is the same as that of the meter shown in Sheet I.

It will be obvious that the dimensions of the apparatus and the number of channels in the drum admit of variation. When very small quantities of water per minute are to be measured, a drum or wheel similar to that shown in Figs. 7, 8, and 9, Sheet II, may be employed.

Fig. 7 is a vertical section. Fig. 8 is a plan, and Fig. 9 is a side view, of the drum or wheel, which is made with two jets or channels of a conical form, or of the form of the contracted vein. The wheel is made of two plates stamped or cast of the form shown in the drawings. The jets $b\,b$ are short conical tubes or ferrules stamped out and placed between the aforesaid plates, which are soldered together. The edges of the plates at $a\,a$ are turned up and down so as to form the retarding-vanes. This drawing also shows a method of reducing the leakage or escape of water between the throat and the wheel. This is effected by inserting one or more thin collars of metal in the neck of the wheel. Any water which passes the first forms an eddy in the space between the collars, which greatly retards the velocity of its exit. These collars may be placed on the throat, instead of on the wheel; or collars may be placed both on the throat and the wheel.

Fig. 7 also shows an oil-cup, J, the bottom of which is bent up so as to bring its bearing against the stem I very near to the pivot. By this means this bearing and the pivot are well lubricated with oil until the oil is almost entirely exhausted.

Having now described the nature of the said invention and in what manner the same is to be performed, I wish it to be understood that what I claim is—

1. The construction of rotary fluid-meters with a revolving wheel or drum having tangential or oblique apertures and connected with a counter and inclosed in a fluid-tight case, and so arranged that the fluid to be measured flows from the center toward the circumference of the wheel or drum, substantially in manner hereinbefore described.

2. The application to rotary fluid-meters of retarding-vanes, substantially in manner and for the purpose hereinbefore described.

3. Constructing the revolving part or wheel of a fluid-meter and the fixed part or pipe, which introduces the fluid into it, with two or more collars or flanges on one or both of the said parts, so as to check the passage of the fluid by the production of eddies, substantially in manner hereinbefore described.

4. Supporting the wheels or revolving parts of fluid-meters by means of a flat or hollow plate or cap of steel or other suitable material attached to the wheel and resting upon a fixed pivot and combined with an oil-chamber, substantially as hereinbefore described.

5. Constructing fluid-meters with a revolving wheel or drum having tangential or oblique apertures and retarding-vanes, and provided with an oil-chamber and pivot and connected to a counter and inclosed in a fluid-tight case, substantially as hereinbefore described.

6. Constructing fluid-meters with a dirt box or strainer arranged so that it may be opened and the dirt removed without disturbing the meter or the pipes, substantially as hereinbefore described in reference to figures.

7. Constructing fluid-meters with the wheel-work or a portion of the wheel-work of the counter inclosed in an oil-chamber which is exposed to the pressure of the fluid in the meter, substantially as hereinbefore described.

In testimony whereof I have signed my name to this specification before two subscribing witnesses.

C. W. SIEMENS.

Witnesses:
CHARLES COWPER,
JOHN R. DARKER.